US011502850B2

(12) United States Patent
Nimura

(10) Patent No.: US 11,502,850 B2
(45) Date of Patent: Nov. 15, 2022

(54) SERVER APPARATUS, CLIENT TERMINAL, INFORMATION PROCESSING SYSTEM AND INFORMATION PROCESSING METHOD

(71) Applicant: CASIO COMPUTER CO., LTD., Tokyo (JP)

(72) Inventor: Ryo Nimura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 267 days.

(21) Appl. No.: 16/843,941

(22) Filed: Apr. 9, 2020

(65) Prior Publication Data
US 2020/0344065 A1 Oct. 29, 2020

(30) Foreign Application Priority Data

Apr. 26, 2019 (JP) .............................. JP2019-086064
Jan. 23, 2020 (JP) .............................. JP2020-009222

(51) Int. Cl.
*H04L 9/40* (2022.01)
*H04L 9/32* (2006.01)

(52) U.S. Cl.
CPC ................................ *H04L 9/3247* (2013.01)

(58) Field of Classification Search
CPC .................................................. H04L 9/3247
See application file for complete search history.

(56) References Cited

U.S. PATENT DOCUMENTS

| 8,966,597 | B1* | 2/2015 | Saylor | H04L 63/0884 |
| | | | | 726/5 |
| 9,515,997 | B1* | 12/2016 | Westman | H04L 63/0428 |
| 10,698,927 | B1* | 6/2020 | Chin | G06F 9/547 |
| 11,232,456 | B2* | 1/2022 | Hyun | H04L 9/0825 |
| 2003/0200439 | A1* | 10/2003 | Moskowitz | G06Q 30/0601 |
| | | | | 713/181 |
| 2005/0050327 | A1 | 3/2005 | Okamoto | |
| 2005/0108548 | A1 | 5/2005 | Ohta | |

(Continued)

FOREIGN PATENT DOCUMENTS

| JP | 2002366849 A | 12/2002 |
| JP | 2005051636 A | 2/2005 |

(Continued)

OTHER PUBLICATIONS

Japanese Office Action (and English language translation thereof) dated Oct. 26, 2021, issued in counterpart Japanese Application No. 2020-009222.

*Primary Examiner* — Ghodrat Jamshidi
(74) *Attorney, Agent, or Firm* — Holtz, Holtz & Volek PC

(57) ABSTRACT

A server apparatus is capable of communicating with a client terminal. The client terminal transmits first information to a second server, receives a digital signature from the second server, and transmits the digital signature together with the first information to the server apparatus. The second server generates the digital signature based on the first information. The server apparatus includes a controller configured to receive the first information and the digital signature from the client terminal, determine whether or not the first information is valid based on the first information and the digital signature received; and, transmit second information to the client terminal when the first information is valid.

12 Claims, 7 Drawing Sheets

(56) References Cited

U.S. PATENT DOCUMENTS

| | | | |
|---|---|---|---|
| 2009/0076966 A1* | 3/2009 | Bishop | G06Q 20/363 705/67 |
| 2009/0293101 A1* | 11/2009 | Carter | G06F 21/6209 726/1 |
| 2013/0019110 A1* | 1/2013 | Lee | H04L 63/0823 713/193 |
| 2014/0177839 A1* | 6/2014 | Wagner | G06F 21/60 380/259 |
| 2016/0140548 A1* | 5/2016 | Ahn | G06Q 20/3829 705/71 |
| 2016/0162883 A1* | 6/2016 | Liscia | G06Q 20/3278 705/71 |
| 2016/0308851 A1* | 10/2016 | Tiwari | H04L 63/126 |
| 2017/0352090 A1* | 12/2017 | Liu | G06Q 20/321 |
| 2018/0091307 A1* | 3/2018 | Takamoto | H04L 9/30 |
| 2018/0146001 A1* | 5/2018 | Chien | H04L 63/0236 |
| 2020/0026834 A1* | 1/2020 | Vimadalal | H04L 9/3247 |

FOREIGN PATENT DOCUMENTS

| | | |
|---|---|---|
| JP | 2005080065 A | 3/2005 |
| JP | 2005167977 A | 6/2005 |
| JP | 2007110377 A | 4/2007 |
| JP | 2013243732 A | 12/2013 |
| JP | 2015162694 A | 9/2015 |

\* cited by examiner

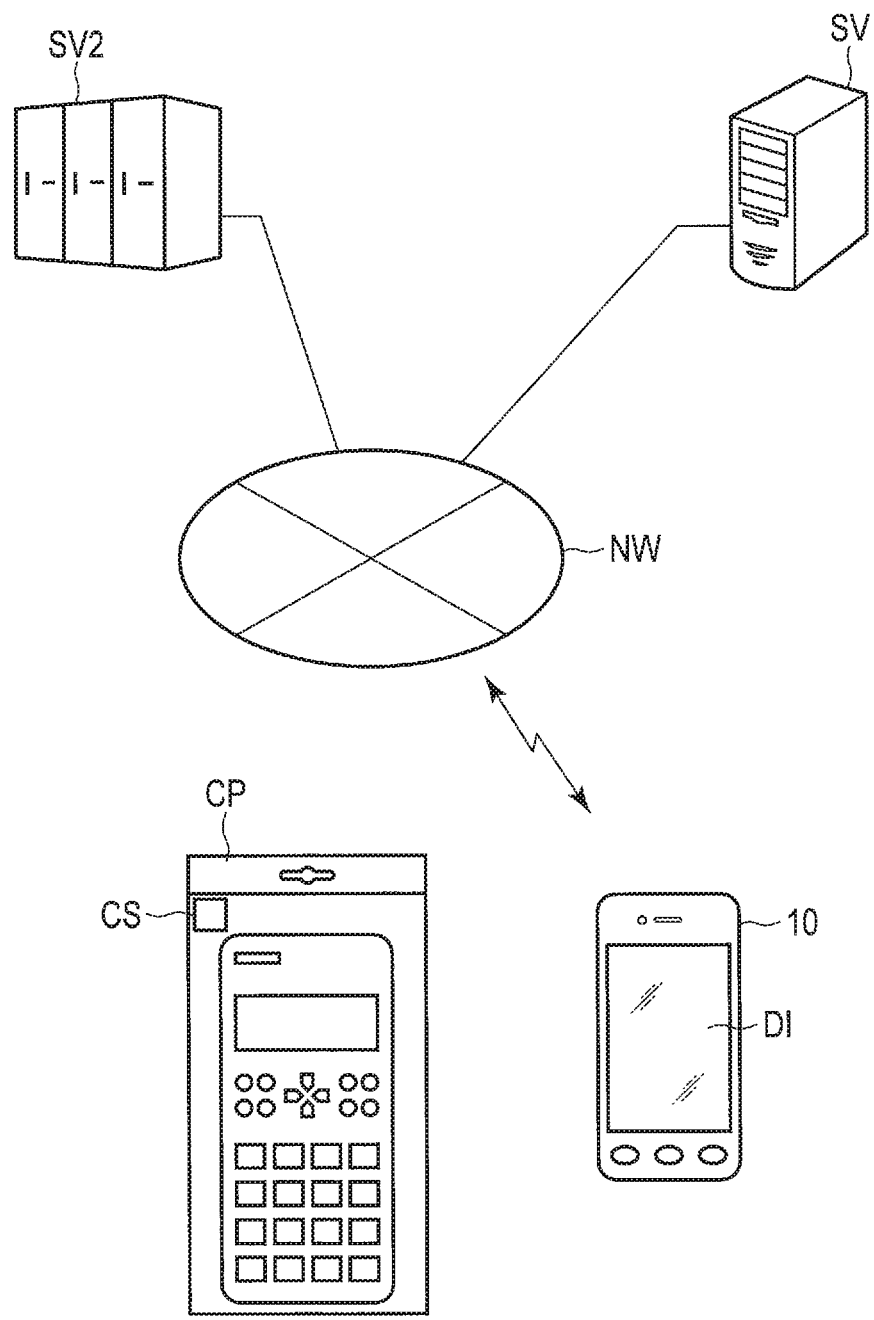
F I G. 1

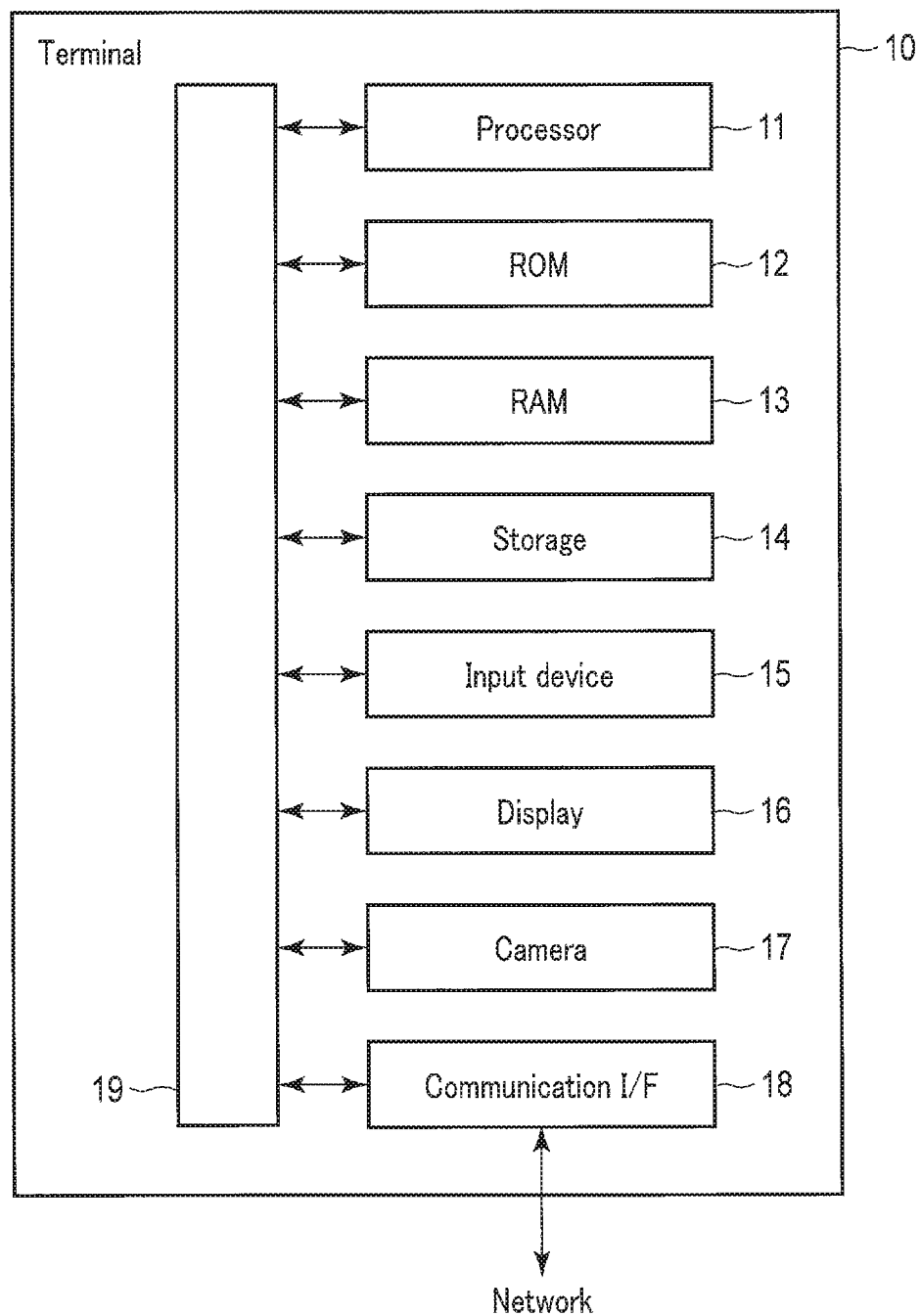
F I G. 2

SERVER APPARATUS, CLIENT TERMINAL, INFORMATION PROCESSING SYSTEM AND INFORMATION PROCESSING METHOD

CROSS-REFERENCE TO RELATED APPLICATIONS

This application is based upon and claims the benefit of priority from the prior Japanese Patent Applications No. 2019-086064, filed Apr. 26, 2019, and No. 2020-009222, filed Jan. 23, 2020, the entire contents of both of which are incorporated herein by reference.

BACKGROUND

1. Technical Field

The technical field relates to a server apparatus, a client terminal, an information processing system, and an information processing method.

2. Description of Related Art

A digital signature technique has been widely disseminated. A client terminal that receives a digital signature based on certain unique information, etc. from a server apparatus can verify whether the unique information is true by the use of the digital signature. However, server apparatuses other than the client terminal and the server apparatus are unable to verify whether the unique information is true. Thus, other server apparatuses are unable to perform appropriate processing according to the truth or falsehood of the received unique information, such as to provide specific information to only external equipment that transmits valid information and not to provide the specific information to external equipment that transmits invalid information.

BRIEF SUMMARY

According to an aspect, a server apparatus is capable of communicating with a client terminal. The client terminal transmits first information to a second server, receives a digital signature from the second server, and transmits the digital signature together with the first information to the server apparatus. The second server generates the digital signature based on the first information. The server apparatus includes a controller configured to receive the first information and the digital signature from the client terminal, determine whether or not the first information is valid based on the first information and the digital signature received; and, transmit second information to the client terminal when the first information is valid.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing an overview of a configuration of a system according to an embodiment.

FIG. 2 is a block diagram showing a hardware configuration of an information terminal according to an embodiment.

DETAILED DESCRIPTION

[Configuration of System]

Figure 3:
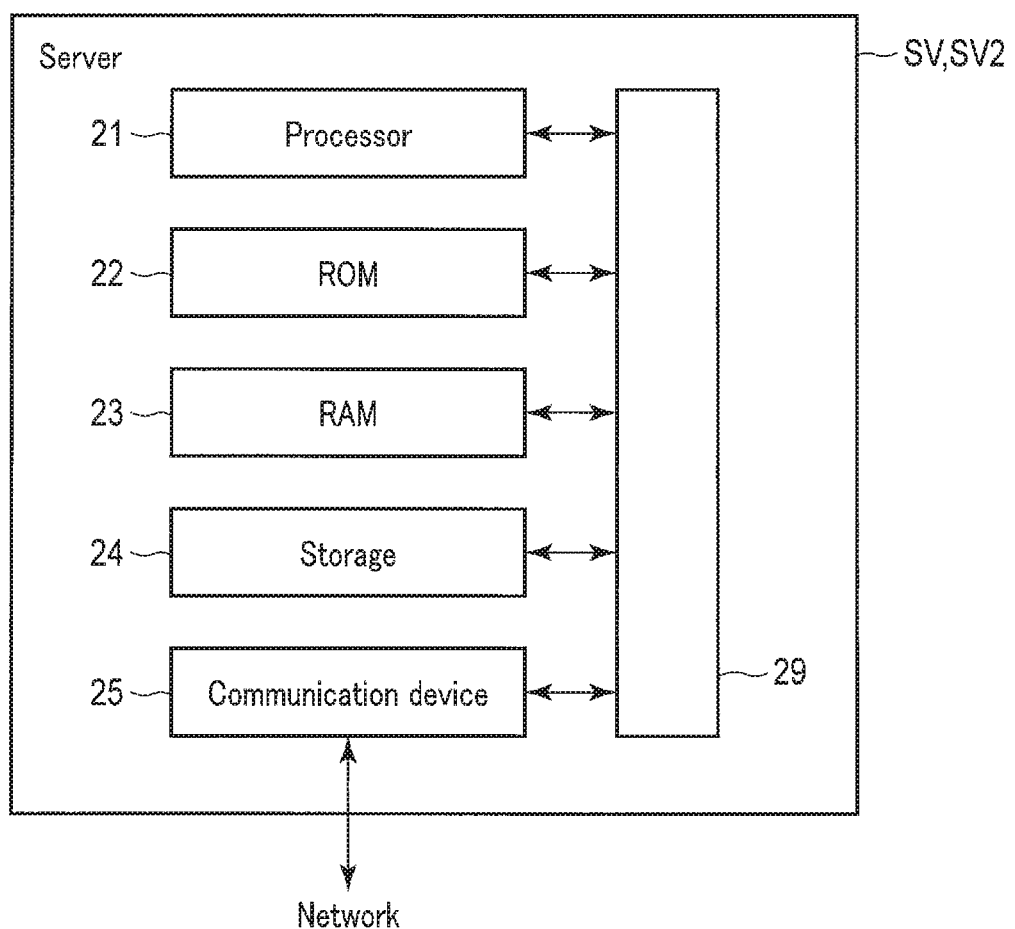
FIG. 3 is a block diagram showing a hardware configuration of a web server according to an embodiment.

FIG. 1 is a diagram showing an overview of a configuration example of a system according to the present embodiment. A system includes an information terminal 10, a web server SV, and a second web server SV2. The information terminal 10 operates as a client. The information terminal 10 is connected to the second web server SV2 via a network NW including the Internet. The information terminal 10 may be various types of information equipment, such as a personal computer (PC), a tablet type terminal, a smart phone, etc. A web browser runs on the information terminal 10. The information terminal 10 uses the web browser to access each web site provided by the second web server SV2 or the web server SV as appropriate via the network NW, and executes transmission/reception of data.

Furthermore, the information terminal 10 has a camera function. The information terminal 10 uses the camera function to photograph a registration sticker CS affixed to the exterior of a commodity package CP of a commodity purchased by a user of the information terminal 10. The commodity is, for example, a scientific electronic calculator. A large part of a housing front face of the information terminal 10 is a display input unit DI. The display input unit DI displays various types of images, a web page when starting a web browser, etc. The display input unit DI also accepts a touch operation corresponding to a display content. The display input unit DI is formed by, for example, integrating a flat panel display, such as a color liquid crystal panel with a back light or a color organic EL panel, and a transparent touch panel, such as a capacitive touch panel.

The second web server SV2 accepts access to a web page according to the registration sticker CS affixed to the commodity package CP and makes a response, and determines whether or not the commodity is purchased as a regular commodity, and replies with a determination result to the information terminal 10, etc.

The web server SV accepts access from the information terminal 10, and after verifying that a user of the information terminal 10 is a purchaser of the regular commodity, performs processing such as user registration. Herein, the second web server SV2 and the web server SV may not be adapted to directly communicate with each other via the network NW. A management matrix of the second web server SV2 and that of the web server SV may be different.

FIG. 2 is a block diagram showing a hardware configuration of the information terminal 10. As shown in FIG. 2, the information terminal 10 includes a processor 11, a Read Only Memory (ROM) 12, a Random Access Memory (RAM) 13, a storage 14, an input device 15, a display 16, a camera 17, and a communication interface (I/F) 18, which are connected to one another via a bus line 19.

The processor 11 performs various types of signal processing. Instead of or together with the processor 11, various types of integrated circuits, such as a central processing unit (CPU), an application specific integrated circuit (ASIC), a field programmable gate array (FPGA), and a graphics processing unit (GPU), may be used. Various types of processors may be used in the information terminal 10.

The ROM 12 stores a boot program, etc. The RAM 13 functions as a main storage device for the processor 11. As the RAM 13, for example, a dynamic RAM (DRAM), a static RAM (SRAM), etc., may be used. As the storage 14, for example, a hard disk drive (HDD), a solid state drive (SSD), an embedded Multi Media Card (eMMC), etc., may be used. The storage 14 stores programs including applications, such as a web browser and a two-dimensional bar code reader, and various types of information, such as parameters, for use by the processor 11. The RAM 13 and the storage 14 are not limited thereto, and may be replaced with various types of storage devices.

The input device 15 is, for example, a keyboard, a mouse, a touch panel, etc. The display 16 is, for example, a liquid crystal display, an organic EL display, etc. A touch panel of the input device 15 is integrated with the display 16 to form the display input unit DI of the information terminal 10 in FIG. 1.

The camera 17 includes an imaging lens optical system, a solid-state image sensor, an A/D conversion circuit, an image processing circuit, etc. The solid-state image sensor includes, for example, a charge coupled device (CCD) image sensor and a complementary metal-oxide semiconductor (CMOS) image sensor. The camera 17 captures a still image or a movie image according to an instruction from the processor 11. The camera 17 stores image data acquired by the image capturing in the storage 14.

The communication interface 18 is used for communicating with equipment external to the information terminal 10. The communication interface 18 establishes a connection with the network NW, e.g., the Internet.

FIG. 3 is a block diagram for explaining a hardware configuration that the web server SV and the second web server SV2 have in common.

As shown in FIG. 3, the web server SV and the second web server SV2 are each an information processing apparatus comprising a processor 21, a ROM 22, a RAM 23, a storage 24, and a communication device 25, which are connected to one another via a bus line 29.

The processor 21 performs various types of signal processing. The ROM 22 stores information to be used for operations of the processor 21. The RAM 23 functions as a main storage device for the processor 21. Various types of storage media may be used as the storage 24. The storage 24 stores various types of information, such as programs and parameters for use by the processor 21.

In FIG. 3, the web server SV and the second web server SV2 are explained as having basically the same hardware configuration. As a matter of course, application programs executed by the processor 21 are different between the web server SV and the second web server SV2. In the present embodiment, the second web server SV2 operates as a determination device that determines whether or not the commodity inside the commodity package CP to which the registration sticker CS is affixed is a regular commodity, and issues a digital signature when it is determined that it is a regular commodity. The web server SV operates as an information processing apparatus by which a user of an external device including the information terminal 10 performs user registration when information received from the external device including the information terminal 10 is determined to be valid.

[Operations of System]

A system 1 according to the present embodiment has many functions. Some of the functions will be described by way of example. Each function is realized by cooperation among the information terminal 10, the web server SV, and the second web server SV2. The following series of processing are performed by the processor 11 as a main device in the information terminal 10 and by the processors 21 as a main device in each of the web server SV and the second web server SV2. Specifically, the operation of the present embodiment starts at a moment the information terminal 10 on which a web browser runs accesses the second web server SV2.

Figure 4:
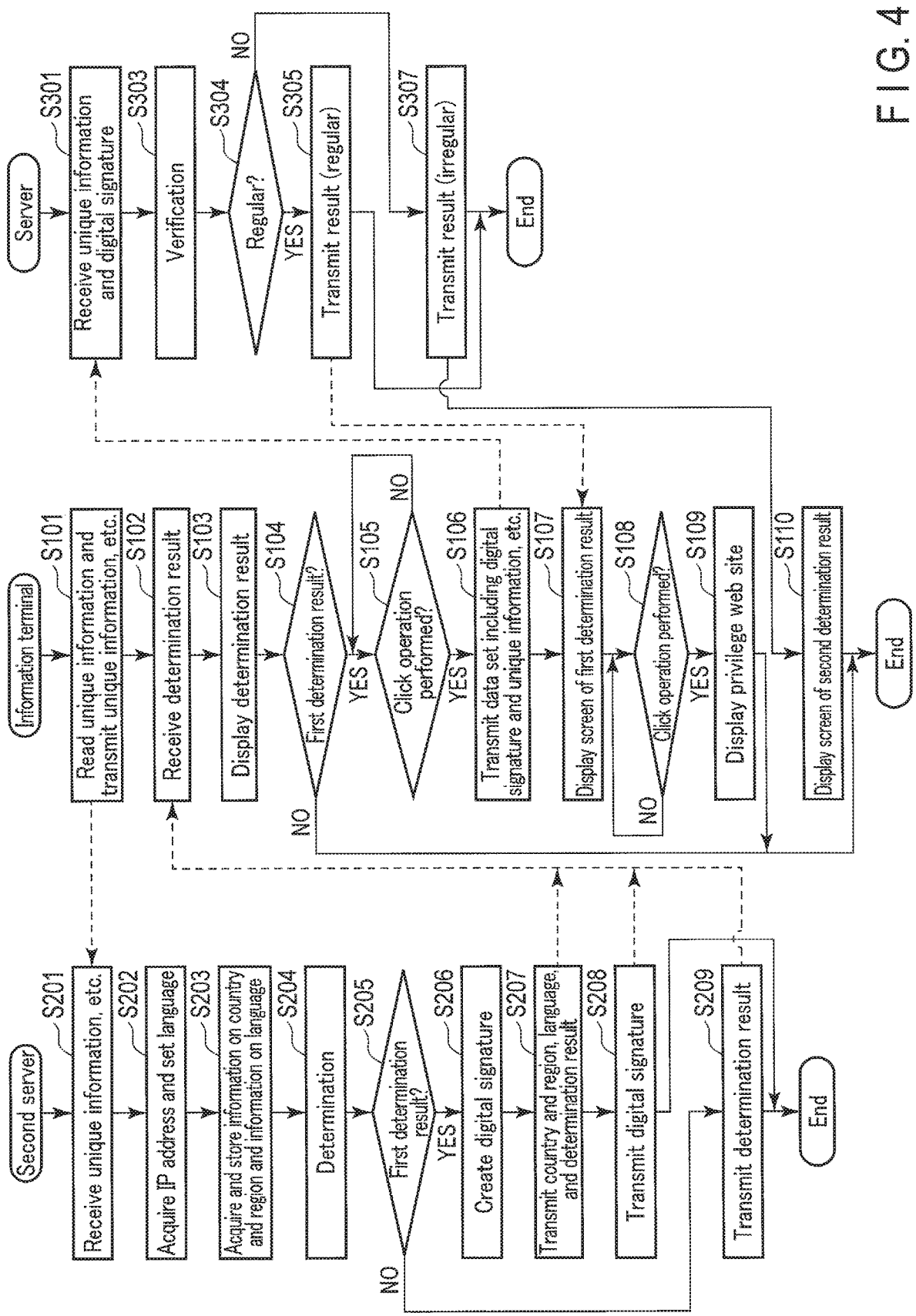
FIG. 4 is a flowchart showing a course of processing of each apparatus according to an embodiment.

FIG. 4 is a flowchart showing a series of processing of the information terminal 10, the web server SV, and the second web server SV2 according to the present embodiment. In the descriptions below, screen examples, etc. shown in FIGS. 5 to 8 will be referred to as appropriate.

The information terminal 10 reads a two-dimensional bar code described on a registration sticker CS affixed to a commodity package CP of a purchased commodity by using an application program of a two-dimensional bar code reader installed in the information terminal 10. Thereby, the information terminal 10 accesses a web page based on a URL included in the read information (step S101).

Figure 5:
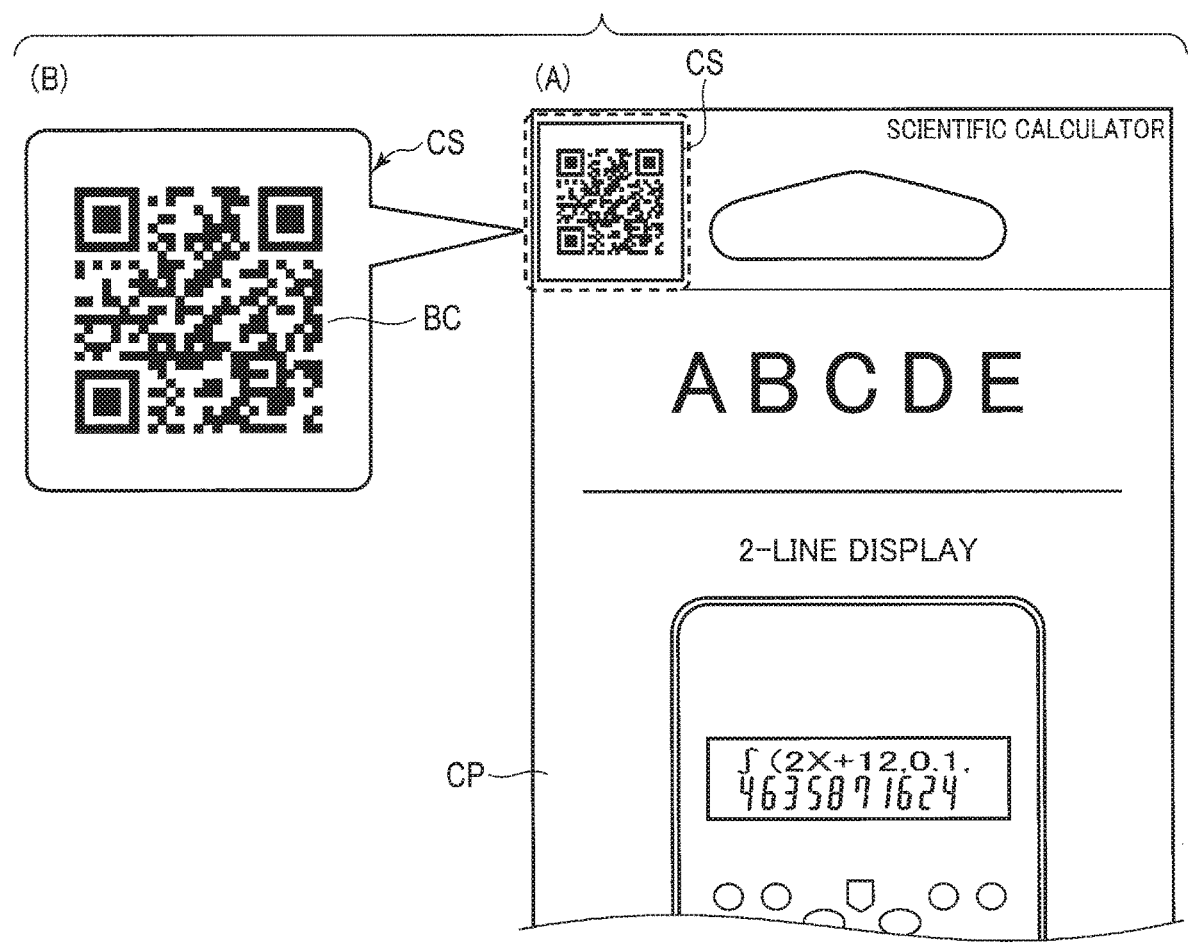
FIG. 5 is a diagram showing a part of the exterior of a commodity package and an example of a description of an affixed registration sticker according to an embodiment.

FIG. 5 is a diagram showing in (B) an enlarged description example of the registration sticker CS affixed to a part of the exterior of the commodity package CP of the commodity shown in (A). The registration sticker CS includes a two-dimensional bar code portion BC.

The two-dimensional bar code portion BC includes a URL for accessing a web page provided by the second web server SV2 and unique ID information linked to the registration sticker CS. The ID information may have a one-to-one correspondence to each registration sticker CS, or may be able to identify a commodity housed in a commodity package CP to which each registration sticker CS is affixed.

The information terminal 10 executes the application program of a two-dimensional bar code reader, and reads an image of the two-dimensional bar code portion BC using the camera 17 and decodes the two-dimensional bar code portion BC. The information terminal 10 displays a URL in the information acquired by the decoding on the display input unit DI. Together, the information terminal 10 displays a button image prompting the user to access a web page of the URL, etc. on the display input unit DI.

By the user of the information terminal 10 performing a touch operation on the button image prompting access in response to a display of the display input unit DI, access to the second web server SV2 is executed.

When the information terminal 10 accesses the second web server SV2 via the network NW, the read unique information and an Internet protocol (IP) address of the information terminal 10 itself, information on a language set in the web browser being used in the information terminal 10, etc. is transmitted together with the URL.

Herein, as long as information such as the unique information necessary for determination in step S204 and information indicating a transmission destination of transmission in step S208 to be described below are transmitted, the information on the language set in the web browser being used in the information terminal 10, etc. may not be transmitted.

The second web server SV2 that has been accessed by the information terminal 10 receives the unique information, etc. (step S201). Then, the second web server SV2 acquires the IP address of the information terminal 10 and the set language of the web browser by access analysis processing (step S202). In a case where the information on the language set in the web browser being used in the information terminal 10, etc. is not transmitted, the associated access analysis processing is not performed.

The second web server SV2 further specifies information indicating country and region of the information terminal 10 based on the acquired IP address, and specifies information indicating language from the set language. The second web server SV2 stores the specified information indicating country and region and information indicating language (step S203). In a case where the information on the language set in the web browser being used in the information terminal 10, etc. is not transmitted, the associated information acquisition and storing are not performed.

The second web server SV2 uses model name information in the unique information received from the information terminal 10 and the ID information of the registration sticker CS to determine the possibility that the current access is from a purchaser of a regular commodity based on a reading status trend of the two-dimensional bar code described on the registration sticker CS (steps S204).

The second web server SV2 determines whether or not a result of the determination is a first determination result indicating that the commodity linked to the ID information on which the determination is performed is a regular commodity (step S205).

If the result is the first determination result (YES in step S205), the second web server SV2 creates a digital signature based on the unique information, etc. and a secret key (step S206).

The second web server SV2 adds a result of encrypting a hash value using the created secret key as a digital signature to the stored information indicating country and region, information indicating language, and unique information, and then unifies them together with display data for reporting the first determination result as response information. Then, the second web server SV2 transmits the response information to the information terminal 10 (step S207). In a case where the stored information indicating country and region, information indicating language, etc. are not acquired and stored, the second web server SV2 may unify only the unique information together with the display data for reporting the first determination result as response information and transmit them to the information terminal 10, or may transmit only the first determination result as response information to the information terminal 10.

Furthermore, the second web server SV2 links the generated digital signature to the corresponding unique information and transmits them to the information terminal 10. In the above manner, the second web server SV2 temporarily ends the processing of FIG. 4 (step S208). Herein, the second web server SV2 may perform the transmission of the digital signature in step S208 and the transmission of the country and region, language, and determination result in step S207 at the same time.

If the determination result is not the first determination result in step S205 (NO in step S205), the determination result will be a second determination result. In this case, the second web server SV2 transmits only display data for reporting the determination result to the information terminal 10. In the above manner, the second web server SV2 temporarily ends the processing of FIG. 4 (step S209).

After transmission processing in step S101, the information terminal 10 receives information on the determination result sent back as a response from the second web server SV2 (step S102). The information terminal 10 displays the determination result based on the display data in the received information on the display 16 (step S103).

Figure 6:
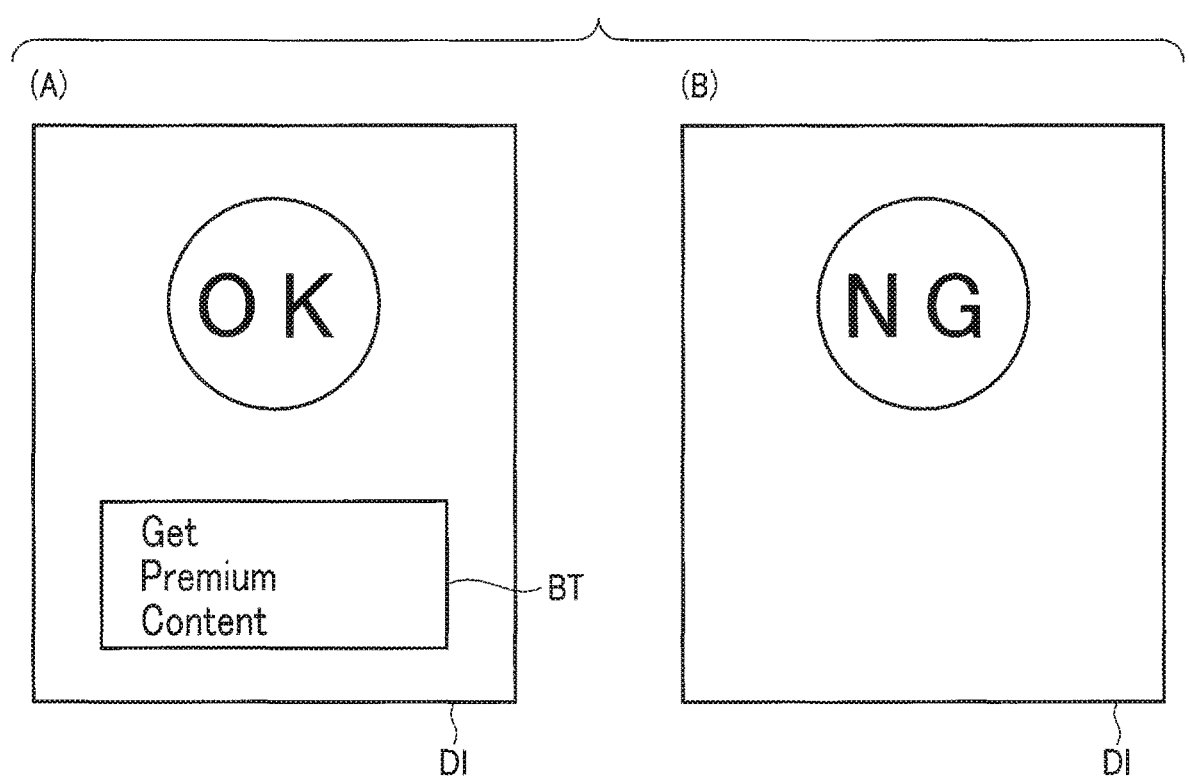
FIG. 6 is a diagram exemplifying respective display screens in an information terminal 10 that receives display data of a first determination result and that of a second determination result according to an embodiment.

FIG. 6 exemplifies determination result screens displayed on the display 16 forming the display input unit DI of the information terminal 10.

FIG. 6 (A) is a diagram exemplifying a display screen in the information terminal 10 that has received the display data of the first determination result. In FIG. 6 (A), a text "OK" indicating that the commodity linked to the ID information on which the determination was performed is a regular commodity is symbolized and displayed, and an operation button BT prompting display of privilege information associated with the purchased commodity is displayed.

FIG. 6 (B) is a diagram exemplifying a display screen in the information terminal 10 that has received the display data of the second determination result. In FIG. 6 (B), a text "NG" indicating that the commodity linked to the ID information on which the determination was performed is not a regular commodity is symbolized and displayed. On this display screen of the second determination result, the operation button BT prompting display of privilege information associated with the purchased commodity shown in FIG. 6 (A) is not displayed.

In FIG. 4, after displaying the determination result shown in FIG. 6 (A) or FIG. 6 (B) in step S103, the information terminal 10 determines whether or not the determination result being displayed is the first determination result (step S104).

If the displayed result is not the first determination result (NO in step S104), the information terminal 10 temporarily ends the processing of FIG. 4.

If the displayed result is the first determination result in step S104 (YES in step S104), the information terminal 10 waits for a click operation on the operation button BT to be performed (step S105).

Then, at a moment the click operation is performed on the operation button BT (YES in step S105), the information terminal 10 executes access to the web server SV based on a URL set in advance in association with the operation button BT, unifies the information indicating country and region, the information indicating language, the unique information, the digital signature, etc. received from the second web server SV2 to transmit to the web server SV (step S106). In step S101, if the information on the language set in the web browser being used in the information terminal 10, etc. is not transmitted, the information terminal 10 may unify only the unique information and the digital signature to transmit to the web server SV in step S106. In addition, the information terminal 10 may unify the digital signature with the unique information, etc., received from the second web server SV2, and transmit the unified unique information, etc. and digital signature received from the second web server SV2 to the web server SV.

The web server SV receives the unique information and the digital signature, etc. from the information terminal 10 (step S301). The web server SV calculates a hash value by the received unique information, etc., and verifies whether or not the access is from a purchaser of a regular commodity by a coincidence comparison with a hash value decrypted using a public key of the received digital signature (step S303).

The web server SV determines whether the access is from a purchaser of a regular commodity based on a result of the verification (step S304).

If the access is from a purchaser of a regular commodity (YES in step S304), a result that the commodity purchased by the user of the information terminal 10 is a regular commodity is obtained. At this time, the web server SV transmits the display data indicating a regular result (the first determination result) including the operation button BT prompting display of privilege information associated with the purchased commodity shown in FIG. 6 (A) to the information terminal 10 (step S305). In the above manner, the web server SV temporarily ends the processing of FIG. 4.

In step S304, if the access is not from a purchaser of a regular commodity as a result of the verification (NO in step S304), then the commodity purchased by the user of the information terminal 10 is not a regular commodity, or the access to the web server SV itself is caused by spoofing, etc. At this time, the web server SV transmits the display data indicating an irregular result (the second determination result) shown in FIG. 6 (B) to the information terminal 10 (step S307) in order to avoid further data communication with the information terminal 10. In the above manner, the web server SV temporarily ends the processing of FIG. 4.

The information terminal 10 receives the data of the first determination result indicating the regular result and displays the data (step S107). Then, the information terminal 10 waits for the click operation on the operation button BT indicating confirmation in the display data to be performed (step S108).

Once the click operation is performed (YES in step S108), the information terminal 10 accesses to a web site providing privilege content in accordance with the received data, to display on the web site (step S109). In the above manner, the information terminal 10 temporarily ends the processing of FIG. 4.

Figure 7:
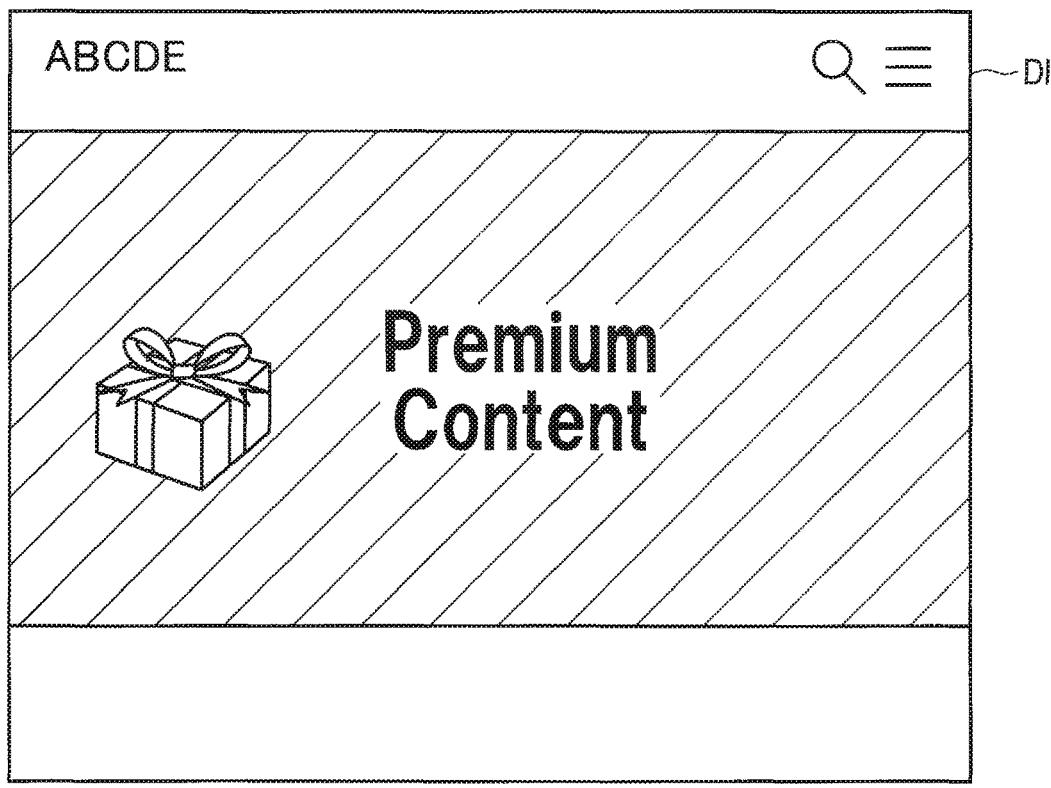
FIG. 7 is a diagram exemplifying a screen of a web site providing user registration and premium content according to an embodiment.

FIG. 7 is a diagram exemplifying, in a case where the information terminal 10 is a tablet terminal or a personal computer, a screen of a web site providing premium content displayed on a display input unit DI thereof.

In FIG. 7, for example, the click operation is prompted by blinking at a position of an image of a gift box with a ribbon, etc. The user actually performs the click operation, to move to a screen for selecting a specific content, setting a transmission destination of the selected content, etc.

If the click operation is performed on the operation button BT indicating confirmation in the display data (YES in step S108), the information terminal 10 transfers to a web site prompting user registration in accordance with the received data. In this case, the web server SV may display the screen of the web page providing the premium content for only a user member who is newly registered.

On the other hand, if the display data indicating an irregular result is received from the web server SV, the information terminal 10 displays the screen of the second determination result indicating the irregular result shown in FIG. 6 (B) (step S110). In the above manner, the web server SV temporarily ends the processing of FIG. 4.

Figure 8:
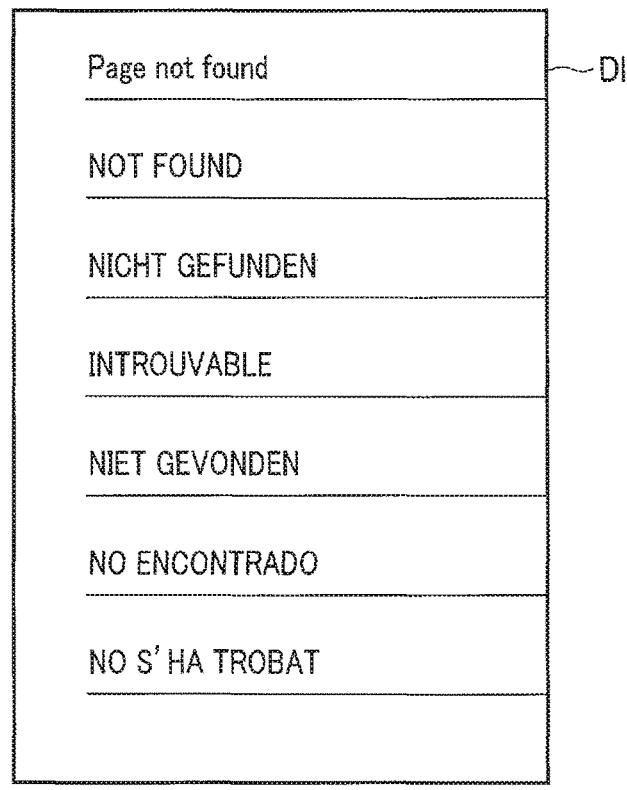
FIG. 8 is a diagram exemplifying an irregular display screen according to an embodiment.

FIG. 8 is a diagram exemplifying, in a case where the information terminal 10 is, for example, a smart phone, a screen of an irregular display as the second determination result displayed on the display input unit DI of the information terminal 10. In FIG. 8, it is displayed that the corresponding web page cannot be found even as a guide message in a plurality of, e.g., eight, languages by using the information indicating country and region and the information indicating language in the data that the web server SV receives from the information terminal 10 as well as information on other languages estimated to be used in close environment.

In a display state of FIG. 8, a link to the next web page, etc. may not be presented on purpose so that a page operation for returning to the screen of the determination result display in the preceding step S103 is not temporarily accepted. In this case, the user of the information terminal 10 has no other choice of operation than to temporarily end the web browser running at that moment to disconnect a connection state with the web server SV. Thus, the connection state between the information terminal 10 and the web server SV can be terminated with certainty.

As described in detail above, according to the present embodiment, another web server SV capable of communicating with the information terminal 10 capable of receiving a digital signature of certain information from the second web server SV2 that creates the digital signature can provide appropriate information to external equipment including the information terminal 10 according to truth and falsehood of information received from the external equipment.

In addition, in the present embodiment, the web server SV can perform information provision using a language considered to be appropriate for the user of the information terminal 10 by using information indicating country and region and information indicating language.

In the present embodiment, furthermore, if access from the information terminal 10 is determined not to be regular as a result of verification using the digital signature in the web server SV, information for disabling subsequent communication is transmitted to the information terminal 10. Thereby, although the web server SV itself does not perform authenticity determination of a commodity, it is possible to appropriately deal with access from a malicious user, such as spoofing.

In the above-described embodiment, the second web server SV2 links the generated digital signature to the corresponding unique information, etc. and transmits the same to the information terminal 10 in step S208, and the information terminal 10 transmits the unique information, etc. and the digital signature to the web server SV in step S106. However, the present invention is not limited thereto. For example, the second web server SV2 may link the generated digital signature to the corresponding unique information, etc. and directly transmit to the web server SV in step S208, and the information terminal 10 may transmit only the unique information, etc. to the web server SV in step S106.

The present invention is not limited to the above-described embodiments, and various modifications can be made in the implementation stage without departing from the gist thereof. Moreover, the embodiments may be implemented by being suitably combined to a maximum extent, in which case a combined effect can be obtained. Furthermore, the above embodiments include inventions at various stages, and various inventions can be extracted by an appropriate combination of a plurality of disclosed constituent elements. For example, even if some structural elements are deleted from all of the structural elements mentioned in the embodiments, in the case where the problem described in the problem to be solved can be solved and the effect described in the effect of the invention can be achieved, the structure from which the structural elements are deleted can be extracted as an invention.

The invention claimed is:

1. A server apparatus capable of communicating with a client terminal, the client terminal transmitting first information to a second server, receiving a digital signature from the second server, and transmitting the digital signature together with the first information to the server apparatus, the second server generating the digital signature based on the first information, the server apparatus comprising a controller including a processor, the controller being configured to:
receive the first information and the digital signature from the client terminal;
determine whether or not the first information is valid based on the first information and the digital signature received, wherein the controller of the server apparatus itself determines whether or not the first information is valid by decrypting the digital signature using a public key and comparing a result of the decryption to a hash value calculated from the received first information; and
transmit second information to the client terminal when the first information is valid.

2. The server apparatus according to claim 1, wherein the controller transmits fourth information different from the second information to the client terminal when the first information is not valid.

3. The server apparatus according to claim 1, wherein the second information is privilege information released exclusively to a purchaser of a commodity associated with the first information determined to be valid.

4. The server apparatus according to claim 3, wherein the second server is configured to:
determine authenticity of the commodity associated with the first information by determining validity of the first information received from the client terminal; and
generate the digital signature based on the first information as a validity determination object when the commodity associated with the first information is real.

5. The server apparatus according to claim 1, wherein the second server is configured to:
determine validity of the first information received from the client terminal; and
generate the digital signature based on the first information when the first information is valid.

6. The server apparatus according to claim 1,
wherein the second server is configured to:
transmit data for displaying an operator for transmitting an acquisition request of the second information together with the digital signature when the first information is valid, and
wherein the client terminal is configured to:
receive the data for displaying the operator transmitted by the second server together with the digital signature;
display the operator based on the received data for displaying the operator; and
transmit the first information and the digital signature received, in response to the displayed operator being operated.

7. The server apparatus according to claim 1, wherein the second server is configured to:
acquire the first information from the client terminal in response to access from the client terminal;
analyze the access from the client terminal so as to acquire third information related to at least any one of a country and a language associated with the client terminal; and
transmit the third information together with the digital signature when the first information is valid,
wherein the client terminal is configured to:
transmit the third information transmitted by the second server together with the first information and the digital signature, and
wherein the server apparatus is configured to:
receive the third information transmitted by the client terminal together with the first information and the digital signature; and
transmit the second information corresponding to the received third information to the client terminal when the first information is valid.

8. An information processing method executed by a server apparatus capable of communicating with a client terminal, the client terminal transmitting first information to a second server, receiving a digital signature from the second server, and transmitting the digital signature together with the first information to the server apparatus, the second server generating the digital signature based on the first information, the method comprising:
receiving, by the server apparatus, the first information and the digital signature transmitted by the client terminal;
determining, by the server apparatus, whether or not the first information is valid based on the first information and the digital signature received, wherein the server apparatus itself determines whether or not the first information is valid by decrypting the digital signature using a public key and comparing a result of the decryption to a hash value calculated from the received first information; and
in response to a determination that the first information is valid, transmitting, by the server apparatus, second information to the client terminal.

9. A non-transitory storage medium storing a program for causing a computer to execute the information processing method according to claim 8.

10. An information processing method in an information processing system comprising a server apparatus, a second server apparatus, and a client terminal, the method comprising:
generating, by the second server apparatus, a digital signature based on first information transmitted by the client terminal, and transmitting, by the second server apparatus, the digital signature to the client terminal;
transmitting, by the client terminal, the first information to the second server apparatus, receiving, by the client terminal, the digital signature transmitted by the second server apparatus, and transmitting, by the client terminal, the digital signature together with the first information to the server apparatus;
receiving, by the server apparatus, the first information and the digital signature transmitted by the client terminal;
determining, by the server apparatus, whether or not the first information is valid based on the first information and the digital signature received, wherein the server apparatus itself determines whether or not the first information is valid by decrypting the digital signature using a public key and comparing a result of the decryption to a hash value calculated from the received first information; and in response to a determination that the first information is valid, transmitting, by the server apparatus, second information to the client terminal when the first information is valid.

11. A client terminal comprising:

a processor configured to:

transmit first information to a second server apparatus;

receive a digital signature transmitted from the second server apparatus that receives the first information and generates the digital signature using the first information;

transmit the received digital signature together with the first information to a server apparatus; and receive second information transmitted from the server apparatus that receives the first information and the digital signature and determines validity of the first information based on the first information and the digital signature received, wherein the server apparatus itself determines whether or not the first information is valid by decrypting the digital signature using a public key and comparing a result of the decryption to a hash value calculated from the received first information.

12. An information processing method in an information processing system comprising a server apparatus, a second server apparatus, and a client terminal, the method comprising:

generating, by the second server apparatus, a digital signature based on first information transmitted by the client terminal, and associating, by the second server apparatus, the digital signature with the first information and transmitting, by the second server apparatus, the same to the server apparatus, transmitting, by the client terminal, the first information to each of the second server apparatus and the server apparatus, and receiving, by the server apparatus, the first information transmitted by the client terminal and the digital signature transmitted by the second server apparatus, determining, by the server apparatus, whether or not the first information is valid based on the first information and the digital signature received, and in response to a determination that the first information is valid, transmitting, by the server apparatus, second information to the client terminal.

\* \* \* \* \*